United States Patent
Raveendran (10) Patent No.: US 8,078,706 B1
(45) Date of Patent: Dec. 13, 2011

(54) METHOD AND SYSTEM FOR FASTER DEVICE LEARNING

(75) Inventor: Ramanan Raveendran, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1638 days.

(21) Appl. No.: 10/883,552

(22) Filed: Jul. 1, 2004

(51) Int. Cl.
*G06F 15/177* (2006.01)
*G06F 15/173* (2006.01)

(52) U.S. Cl. .......... 709/223; 709/220
(58) Field of Classification Search .......... 709/223
See application file for complete search history.

(56) References Cited

U.S. PATENT DOCUMENTS

| | | | |
|---|---|---|---|
| 7,143,156 B2* | 11/2006 | Menzies et al. | 709/223 |
| 2003/0009543 A1* | 1/2003 | Gupta | 709/223 |

OTHER PUBLICATIONS

SimpleSoft, Inc., "SimpleAgentPro Release Notes", Version 8.5, Oct. 15, 2004, 14 pages.

\* cited by examiner

*Primary Examiner* — Ian N Moore
*Assistant Examiner* — Afshawn Towfighi
(74) *Attorney, Agent, or Firm* — Fish & Richardson P.C.

(57) ABSTRACT

Method and system for faster device learning are provided. The invention provides a method of sending multiple object identifiers in a single Get Next Request, enabling the learning of the management information of more than one variable simultaneously, and reducing the time required for learning the management information of the network. Multiple OIDs are generated from an OID, and they are sent in a single request packet, to learn their management information. The invention also provides a network comprising a Network Management System (NMS), at least one device, and a set of variables residing in each device. The NMS is capable of sending at least one OID in a single request to the device.

13 Claims, 10 Drawing Sheets

| OID No. | OID | Value |
|---|---|---|
| 1) | 1.3.6.1.2.1.1.1.0 | RO, fixed(Cat8500) |
| 2) | 1.3.6.1.2.1.1.2.0 | RO, fixed(1.3.6.1.4.1.9.1.202) |
| 3) | 1.3.6.1.2.1.1.3.0 | RO, clock(812980413) |
| 4) | 1.3.6.1.2.1.1.4.0 | RO, fixed(rraveend) |
| 5) | 1.3.6.1.2.1.2.2.1.2.1 | RO, fixed(ATM0) |
| 6) | 1.3.6.1.2.1.2.2.1.2.2 | RO, fixed(Ethernet0) |
| 7) | 1.3.6.1.2.1.2.2.1.3.1 | RO, fixed(53) |
| 8) | 1.3.6.1.2.1.2.2.1.3.2 | RO, fixed(6) |
| 9) | 1.3.6.1.2.1.2.2.1.5.1 | RO, random(155520000, 100) |
| 10) | 1.3.6.1.2.1.2.2.1.5.2 | RO, random(10000000, 100) |
| 11) | 1.3.6.1.2.1.2.2.1.5.3 | RO, random(-1, 100) |
| 12) | 1.3.6.1.2.1.2.2.1.6.1 | RO, fixed() |
| 13) | 1.3.6.1.2.1.2.2.1.6.2 | RO, fixed(0x00d0583f3f00) |
| 14) | 1.3.6.1.2.1.2.2.1.6.3 | RO, fixed() |
| 15) | 1.3.6.1.2.1.2.2.1.7.1 | RO, fixed(1) |
| 16) | 1.3.6.1.2.1.2.2.1.7.2 | RO, fixed(1) |
| 17) | 1.3.6.1.2.1.2.2.1.7.3 | RO, fixed(1) |
| 18) | 1.3.6.1.2.1.2.2.2.5.2 | RO, random(10000000, 100) |
| 19) | 1.3.6.1.2.1.2.2.2.6.1 | RO, fixed(234) |
| 20) | 1.3.6.1.2.1.2.2.2.6.2 | RO, fixed(0x003f3f00) |
| 21) | 1.3.6.1.2.1.2.2.2.7.1 | RO, fixed(2456) |
| 22) | 1.3.6.1.2.1.2.2.2.7.2 | RO, fixed(0x003f00) |
| 23) | 1.3.6.1.2.1.2.2.2.8.1 | RO, fixed(34) |
| 24) | 1.3.6.1.2.1.2.2.2.8.2 | RO, fixed(0x0000) |
| 25) | 1.3.6.1.2.1.2.3.1.1.1 | RO, fixed(1) |
| 26) | 1.3.6.1.2.1.2.3.1.1.2 | RO, fixed(2) |
| 27) | 1.3.6.1.2.1.2.3.1.1.3 | RO, fixed(1) |
| 28) | 1.3.6.1.2.1.2.3.1.1.4 | RO, fixed(2) |
| 29) | 1.3.6.1.2.1.2.3.1.2.1 | RO, fixed(1) |
| 30) | 1.3.6.1.2.1.2.3.1.2.2 | RO, fixed(2) |
| 31) | 1.3.6.1.2.1.2.3.1.2.3 | RO, fixed(1) |
| 32) | 1.3.6.1.2.1.2.3.1.2.4 | RO, fixed(2) |
| 33) | 1.3.6.1.2.1.2.3.1.3.1 | RO, fixed(1) |
| 34) | 1.3.6.1.2.1.2.3.1.3.2 | RO, fixed(2) |
| 35) | 1.3.6.1.2.1.2.3.1.3.3 | RO, fixed(1) |

FIG. 7A

| | | |
|---|---|---|
| 36) | 1.3.6.1.2.1.2.3.1.3.4 | RO , fixed (2) |
| 37) | 1.3.6.1.2.1.3.1.1.1.2.1.10.77.241.1 | RO , fixed(2) |
| 38) | 1.3.6.1.2.1.3.1.1.2.2.1.10.77.241.1 | RO, ixed(0x00044) |
| 39) | 1.3.6.1.2.1.4.1.0 | RO , fixed (1) |
| 40) | 1.3.6.1.2.1.4.2.0 | RO , fixed (255) |
| 41) | 1.3.6.1.2.1.4.3.0 | RO , randomup(3182287, 100) |
| 42) | 1.3.6.1.2.1.4.4.0 | RO , randomup(0, 100) |
| 43) | 1.3.6.1.2.1.4.5.0 | RO , randomup(0, 100) |
| 44) | 1.3.6.1.2.1.4.6.0 | RO , randomup(2, 100) |
| 45) | 1.3.6.1.2.1.4.20.1.1.10.77.241.54 | RO fixed(10.77.241.54) |
| 46) | 1.3.6.1.2.1.4.20.1.2.10.77.241.54 | RO , fixed(2) |
| 47) | 1.3.6.1.2.1.4.21.1.1.0.0.0.0 | RO , fixed(0.0.0.0) |
| 48) | 1.3.6.1.2.1.4.21.1.1.10.77.241.0 | RO , fixed(10.77.241.0) |
| 49) | 1.3.6.1.2.1.4.21.1.2.0.0.0.0 | RO , fixed(0) |
| 50) | 1.3.6.1.2.1.4.23.0 | RO , randomup(0, 100) |
| 51) | 1.3.6.1.2.1.5.1.0 | RO , randomup(76500, 100) |
| 52) | 1.3.6.1.2.1.5.2.0 | RO , randomup(0, 100) |
| 53) | 1.3.6.1.2.1.5.3.0 | RO , randomup(12, 100) |
| 54) | 1.3.6.1.2.1.5.25.0 | RO , randomup(0, 100) |
| 55) | 1.3.6.1.2.1.5.26.0 | RO , randomup(0, 100) |
| 56) | 1.3.6.1.4.1.9.2.1.1.0 | RO , fixed(SNMP) |
| 57) | 1.3.6.1.4.1.9.2.1.2.0 | RO , fixed(bus error at) |
| 58) | 1.3.6.1.4.1.9.2.1.3.0 | RO , fixed(C8540MSR) |
| 59) | 1.3.6.1.4.1.9.2.1.4.0 | RO , fixed() |
| 60) | 1.3.6.1.4.1.9.2.1.5.0 | RO , fixed(10.77.212.22) |
| 61) | 1.3.6.1.4.1.9.2.1.6.0 | RO , fixed(0.0.0.0) |
| 62) | 1.3.6.1.4.1.9.2.2.1.1.1.1 | RO , fixed(Unknown) |
| 63) | 1.3.6.1.4.1.9.2.2.1.1.1.2 | RO , fixed(SonicT) |
| 64) | 1.3.6.1.4.1.9.2.2.1.1.1.3 | RO , fixed(Unknown) |
| 65) | 1.3.6.1.4.1.9.2.2.1.1.2.1 | RO , fixed(1) |
| 66) | 1.3.6.1.4.1.9.2.4.1.1.1.10.77.241.54 | RO , fixed (non- volatile memory) |
| 67) | 1.3.6.1.4.1.9.2.4.1.1.2.10.77.241.54 | RO , fixed(0.0.0.0) |
| 68) | 1.3.6.1.4.1.9.2.4.4.0 | RO , fixed(512) |
| 69) | 1.3.6.1.4.1.9.2.4.5.0 | RO , fixed(0) |
| 70) | 1.3.6.1.4.1.9.2.4.6.0 | RO , fixed(0) |

FIG. 7B

| | | |
|---|---|---|
| 71) | 1.3.6.1.4.1.9.2.4.8.0 | RO , clock(429496729) |
| 72) | 1.3.6.1.4.1.9.5.11.1.1.1.0 | RO , fixed(5) |
| 73) | 1.3.6.1.4.1.9.5.11.1.1.2.0 | RO , fixed(6) |
| 74) | 1.3.6.1.4.1.9.5.11.1.1.3.0 | RO , fixed(8) |
| 75) | 1.3.6.1.4.1.9.9.10.1.1.1.0 | RO , fixed(5) |
| 76) | 1.3.6.1.4.1.9.9.10.1.1.2.1.2.1 | RO , fixed(0) |
| 77) | 1.3.6.1.4.1.9.9.10.1.1.2.1.2.2 | RO , fixed(-131071) |
| 78) | 1.3.6.1.4.1.9.9.10.1.1.2.1.2.3 | RO , fixed(7602176) |
| 79) | 1.3.6.1.4.1.9.10.10.1.1.1.0 | RO , fixed(8) |
| 80) | 1.3.6.1.4.1.9.10.10.1.1.2.0 | RO , fixed(1) |
| 81) | 1.3.6.1.4.1.9.10.10.1.1.3.0 | RO , fixed(2) |
| 82) | 1.3.6.1.4.1.9.10.10.1.1.4.1.2.1 | RO , fixed(16777215) |
| 83) | 1.3.6.1.4.1.9.10.10.1.1.4.1.2.2 | RO , fixed(16777215) |
| 84) | 1.3.6.1.4.1.23.2.20.1.1.1.1.1 | RO , fixed(1) |
| 85) | 1.3.6.1.4.1.23.2.20.1.1.1.2.1 | RO , fixed(1) |
| 86) | 1.3.6.1.4.1.23.2.20.1.1.1.3.1 | RO , randomup(0, 100) |
| 87) | 1.3.6.1.4.1.23.2.20.1.2.1.1.1 | RO , fixed(1) |
| 88) | 1.3.6.1.4.1.353.5.4.1.1.1.1.0 | RO , fixed(2) |
| 89) | 1.3.6.1.4.1.353.5.4.1.1.1.2.0 | RO , fixed(2) |
| 90) | 1.3.6.1.6.3.1.1.6.1.0 | RO , fixed(0) |
| 91) | 1.3.6.1.6.3.10.2.1.1.0 | RO , fixed(0x3f00583f3f00) |
| 92) | 1.3.6.1.6.3.10.2.1.2.0 | RO , fixed(1) |
| 93) | 1.3.6.1.6.3.10.2.1.3.0 | RO , fixed(8129804) |
| 94) | 1.3.6.1.6.3.11.2.1.1.0 | RO , randomup(0, 100) |
| 95) | 1.3.6.1.6.3.11.2.1.2.0 | RO , randomup(0, 100) |
| 96) | 1.3.6.1.6.3.11.2.1.3.0 | RO , randomup(0, 100) |
| 97) | 1.3.6.1.6.3.12.1.1.0 | RO , fixed(859032) |
| 98) | 1.3.6.1.6.3.12.1.4.0 | RO , randomup(0, 100) |
| 99) | 1.3.6.1.6.3.12.1.5.0 | RO , randomup(0, 100) |
| 100) | 1.3.6.2.1.3.1.1.0 | RO , fixed(852) |
| 101) | 1.3.6.2.2.3.2.0 | RO , randomup(0, 100) |
| 102) | 1.3.6.3.5.0 | RO , randomup(0, 100) |

METHOD AND SYSTEM FOR FASTER DEVICE LEARNING

BACKGROUND OF THE INVENTION

This invention relates in general to network management and more specifically to reducing the number of requests that need to be sent to a device to learn the management information of the device.

Network management involves managing the network resources, in order to meet service-level objectives. A Network Management System (NMS) monitors and measures the performance of a network across local and wide-area links, and also the services running on that network. The NMS typically includes tools for gathering data of the network elements; tools for data storage, analysis and prediction; tools for the configuration and control of the network elements; and tools for performance and system-planning management.

The NMS has two primary elements: a manager and an agent. The manager is an interface through which a network administrator manages the network. An agent acts as an interface between the manager and an actual device being managed. Each device includes a set of variables. Each variable on a device is identified by the NMS with a unique entity called an Object Identifier (OID).

In a network, same OID can be available in many devices. A particular OID represents the same parameter in all the devices. If the parameter is applicable for a device, then the OID is supported. For example, let the OID 1.3.6.1.2.1.3.1.0 represent the number of TCP packets received by a device. Then, Router 1: 1.3.6.1.2.1.3.1.0 represents the number of TCP packets received by Router 1, and Router 2: 1.3.6.1.2.1.3.1.0 represents the number of TCP packets received by Router 2, so on and so forth.

Some examples of the devices that contain managed variables are bridges, hubs, routers and network servers. The variables include hardware, configuration parameters and performance statistics, which directly relate to the current operation of the device in question. For example, for a device such as RAM, the managed variables include free buffer space, total buffer space, RAM speed, percentage of buffer space being used, etc. Each managed variable is represented by an OID. The parameters characterizing these variables are arranged in a Management Information Base (MIB), which is a virtual information database.

Communication between the network manager and the agents, to access the variables, is enabled by a communication protocol such as the Simple Network Management Protocol (SNMP). SNMP is an application layer protocol that facilitates communication between a device and a network management application through the use of Protocol Data Units (PDUs). SNMP is used to communicate management information between the network management systems and the agents in the network elements.

The NMS sends in requests to the devices for management information by means of a Get Request or a Get Next Request PDU. Each device responds to the request with a Get Response PDU, or sends an unsolicited message of unusual events to the management application, with the help of a Trap PDU.

The conventional techniques allow only one OID to be learnt in a single Get Next Request. Therefore, if there are 'N' variables, i.e., 'N' OIDs are available in a device, then 'N' separate Get Next Requests need to be sent to the device. For example, if there are 20,200 supported OIDs on a device, the time taken will be 20,200*(2*µ), where 'µ' is the time taken for the SNMP query to reach the device. Consequently, the time required to learn the management information of a device increases with the added number of variables. Much time is wasted in transmitting and receiving queries. Currently, the transmitting time is high because the number of Get Next Request packets sent to the device is very high, since one request packet is sent for each OID.

SUMMARY OF EMBODIMENTS OF THE INVENTION

In one embodiment, the invention provides a method for faster device learning. The method includes sending a request for an initial OID to a device; receiving the initial OID in the response; splitting the received OID repeatedly by removing the last number in the OID, and incrementing the penultimate number by one, thereby, generating a set of OIDs, and splitting the OID tree into ranges; iterating an OID in each range by sending an OID from each range in a single request; checking for variables that have reached their end and purging the OIDs identifying such variables; sending the OIDs left, after the purging, in a single request, thereby learning the management information of different variables simultaneously; storing the management information of the variables, and repeating this method until the management information of all the variables in the network is learnt.

In another embodiment, the received OID is split by removing the last number in the OID and multiplying the penultimate number by a constant, e.g., 2.

In another embodiment, the invention provides a network comprising a network management system (NMS), at least one device and a set of variables residing in each device. The NMS manages the devices by learning the management information of each of the devices in the network. The NMS includes a module for sending a request; one for receiving a response; one for splitting an OID; one for determining whether a variable has reached its end; one for purging a variable; and one for storing the management information of the learnt variables.

BRIEF DESCRIPTION OF THE DRAWINGS

FIG. 7 illustrates an exemplary OID tree, formed by the OIDs identifying different parameters of a device in a network.

DETAILED DESCRIPTION OF EMBODIMENTS OF THE INVENTION

For the sake of convenience, appropriate explanations of some terms used in the description of embodiments are given below. It is to be understood that these explanations have been given merely to aid better understanding of the description, and they are not to be considered as limiting the scope of the invention, as claimed.

Network Management System (NMS): An NMS executes the applications that monitor and control managed devices. An NMS provides the bulk of the processing and memory resources required for network management. One or more NMSs exist on any managed network.

Agent: An agent is a software module in a device, which is responsible for maintaining local management information and delivering that information to a manager via a network management protocol. A management information exchange can be initiated by the manager (via polling) Or by the agent (via a trap). Agents function as collection units that gather and send data regarding the managed resources in response to a request from the manager.

Object Identifier (OID): An OID is a series of numbers that uniquely identifies a parameter's value on a device Management Information Base (MIB): A MIB is a database describing application parameters such as hardware, configuration parameters, and the performance statistics that directly relate to the current operation of the device. This database is present in the agent and is used by a network manager to send a request to the agent and interpret the received signals.

Learning a device: Learning a device comprises reading all the OID-value pairs of a set of variables in the device and create an exact copy of it in another location.

Figure 1:
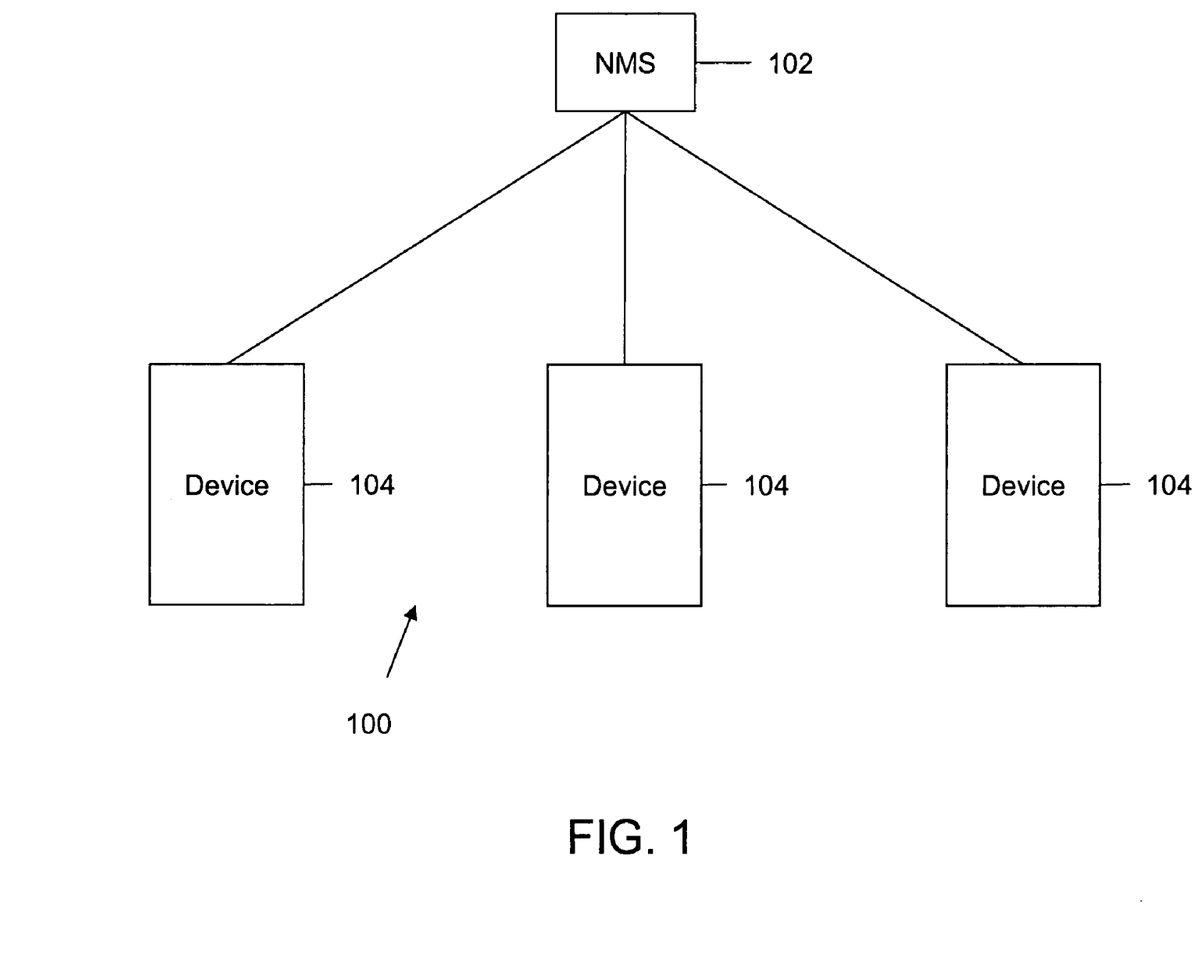
FIG. 1 illustrates an environment of an exemplary embodiment of the present invention, which is a network of devices containing management information, and a network management system to manage these devices.

FIG. 1 illustrates an environment in an exemplary embodiment of the present invention. The environment is a network 100, comprising a Network Management System (NMS) 102, which manages a plurality of devices 104, which contains management information. Network 100 can be a wired network, or a wireless network including LAN, WAN, a wireless LAN, etc. Devices 104 are network devices such as routers and access servers, switches and bridges, hubs, computer hosts and printers. The present invention can be practiced on any network comprising at least one NMS, and at least one device comprising management information.

Figure 2:
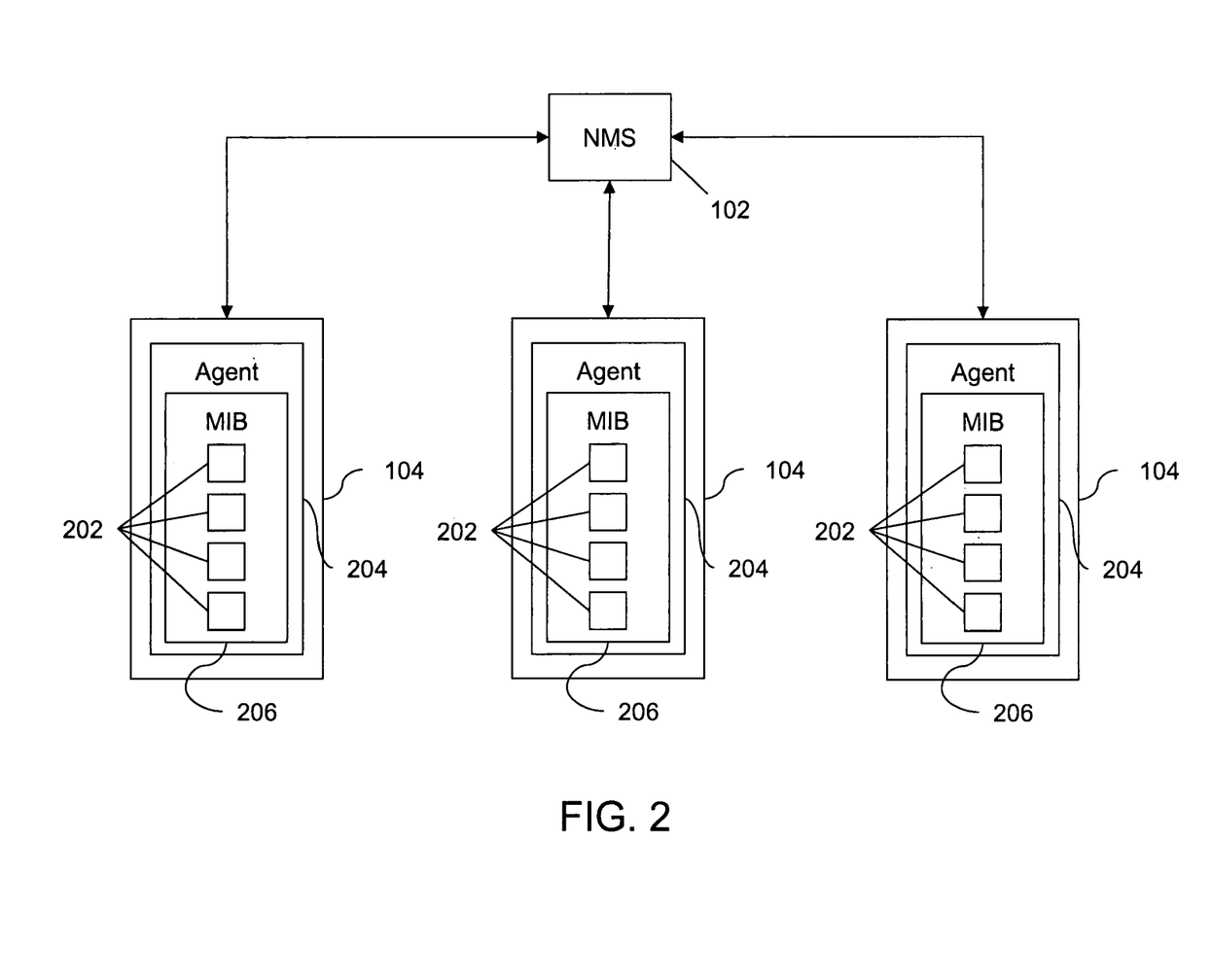
FIG. 2 illustrates a network, in accordance with an exemplary embodiment of the present invention.

FIG. 2 illustrates network 100 in an exemplary embodiment of the present invention. Network 100 comprises NMS 102 that manages a plurality of devices 104 comprising management information. Each device 104 comprises an agent 204, which in turn contains a Management Information Base (MIB) 206. MIB 206 includes a plurality of variables 202. Examples of the variables include number of files in ROM, size of RAM, number of input packets, number of output packets, etc. Agent 204 maintains local management information and delivers that information to NMS 102 via a network management protocol. An example of a network management protocol is the Simple Network Management Protocol (SNMP). MIB 206 is a database that stores the management information of all the variables of device 104.

The OIDs identifying the respective variables of a device are arranged in a hierarchical, inverted tree structure. The OID tree begins with a root OID and expands into branches. In an embodiment, the OIDs in the tree can be lexicographically arranged.

Given two sequences of nonnegative integers (x1, x2 ... xn) and (y1, y2 ... ym), (x1, x2 ... xn) precedes (y1, y2 ... ym) in lexicographic order if the following conditions are met:
Rule 1: [($x_j=y_j$ for $1<=j<=k$) AND ($x_k<y_k$ for $k<=n,m$)] OR
Rule 2: [($x_j=y_j$ for $1<=j<=n$) AND ($n<m$)]

An example illustrating Rule 1 is as follows:
Consider OIDs 1.3.6.2.4.8.9 and 1.3.6.2.9.7.
For 1.3.6.2.4.8.9, ($x_1=1, x_2=3, \ldots, x_n=9$), n=7 (i.e., number of integer values)
For 1.3.6.2.9.7 ($y_1=1, y_2=3, \ldots, y_m=7$), m=6
In this case, $x_j=y_j$ for $1<=j<=k$, k=4, i.e., both the numbers are the same until 1.3.6.2. Also, $x_k<y_k$ for $k<=n, m$. For example, for k=5, 5th integer of the first sequence '4' is less than the 5th integer of the second sequence '9'. Hence, the OLD 1.3.6.2.4.8.9 is lexicographically smaller (i.e., less) than the OID 1.3.6.2.9.7.

Similarly, an example illustrating Rule 2 is as follows:
Consider the OIDs as 1.3.6.2.4 and 1.3.6.2.4.8.9.
For 1.3.6.2.4, $x_1=1, x_2=3, \ldots x_n=4$, where n=5
For 1.3.6.2.4.8.9, $y_1=1, y_2=3, \ldots y_m=9$, where m=7
In this case, $x_j=y_j$ for $1<=j<=n$, j, n=5, i.e., both the numbers are the same until 1.3.6.2.4. However, n<m, i.e., 5<7. Hence, the OID 1.3.6.2.4 is lexicographically smaller (i.e. less) than the OID 1.3.6.2.4.8.9.

In case of lexicographical ordering in an embodiment, object identifier tree is drawn so that the branches under each node are arranged in an increasing order from left to right. With this convention, the lexicographical order is generated by traversing the tree, which is defined recursively as follows.
Visit the root tree
Traverse the sub-tree from left to right
This method of traversal is also known as a depth-first search of the tree.

There is a two-way communication between NMS 102 and devices 104. NMS 102 may either request management information of the variables, or set the value of a variable. Device 104 responds to the request with the required management information, or sends unsolicited messages to NMS 102, when it detects some significant event such an error in its functioning.

A generalized request is described as follows:
Let "$\Sigma$" be the set of all the OIDs supported by the device. A request, GN ($A_n, B_n, C_n, \ldots, M_n$) gives a response ($A_{n+1}, B_{n+1}, C_{n+1}, \ldots, M_{n+1}$) where $A_n<A_{n+1}$ & $A_n<B_n$ and $A_{n+1}$ is an element of set $\Sigma$, which is just greater than $A_n$. For example, if $\Sigma=\{2, 5, 12, 20, 31, \ldots, 45\}$, $A_n=8$, then $A_{n+1}$ is 12, since 12 is an element in $\Sigma$, which is just greater than 8. M is the number of variables in the request GN function, wherein, $1<=M<=$maximum limit of the function, and '<' (lesser than) means '$A_n$' is "lesser than '$A_{n+1}$' by some definite unique means". For example, 12<67, abc<aeb, 1.3.6.1<1.3.7.2. It is to be noted that An, Bn, $C_n, \ldots, M_n$ may or may not be present in the set $\Sigma$, but $A_{n+1}, B_{n+1}, C_{n+1}, \ldots, M_{+1}$ are always present in $\Sigma$.

It is to be noted that while the working of the invention has been explained, assuming the SNMP protocol, the working of the present invention is also applicable to any other network management protocol, without diverting in any way from the scope of the present invention.

Figure 3:
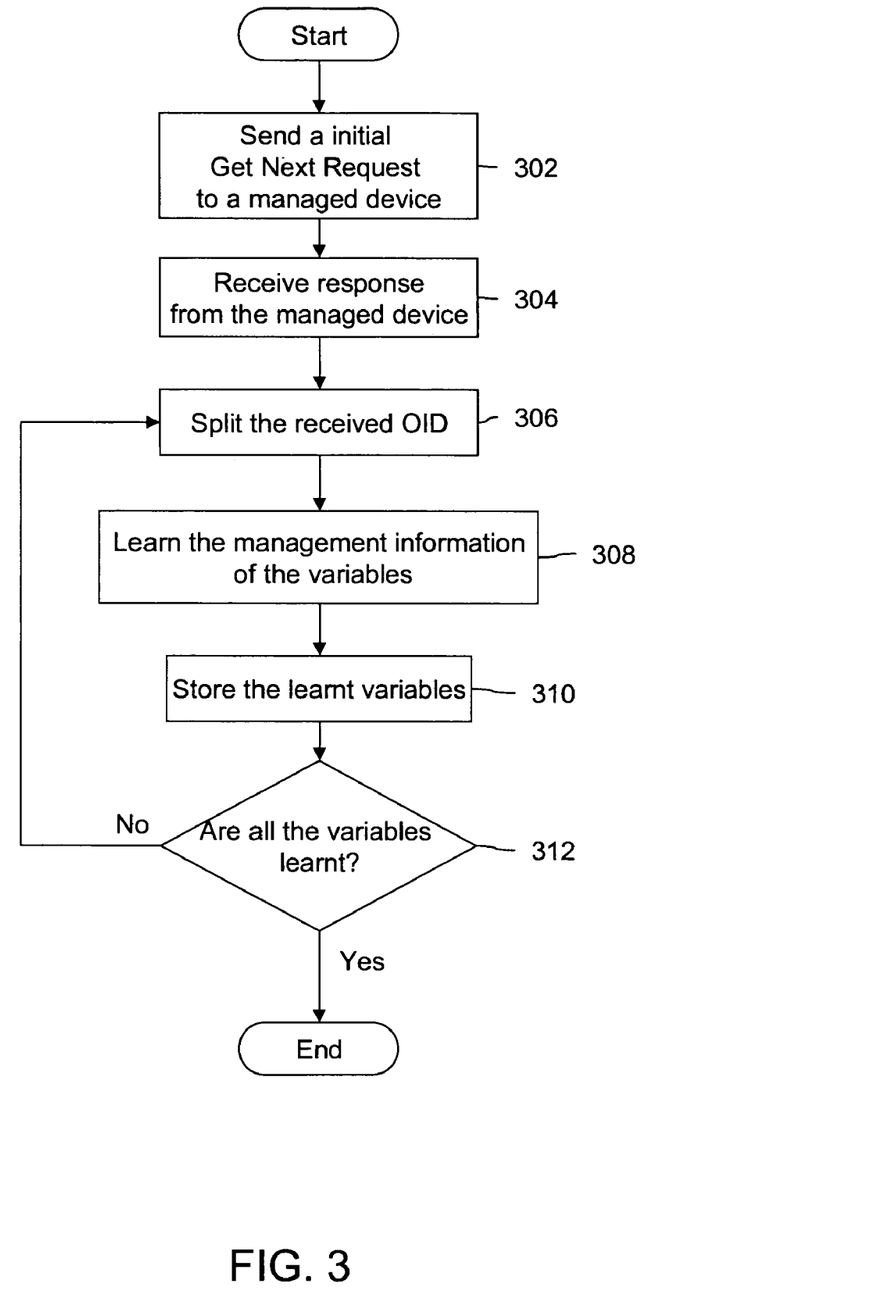
FIG. 3 is a flowchart depicting the working of the present invention.

FIG. 3 is a flowchart depicting the working of the invention. NMS 102 sends a Get Next Request at step 302 to device 104 for the OID of a variable within device 104. Device 104 sends a response to the request, at step 304. The OID received in the response is then split at step 306 to generate a set of OIDs. The process of splitting is further explained in conjunction with FIG. 4. The management information of the generated set of OIDs is subsequently learnt at step 308. This learning is performed by sending at least one OID in a single request to device 104. The process of splitting and learning the set of OIDs is repeated until the management information of all the variables is learnt, which is then stored at step 310.

Figure 4:
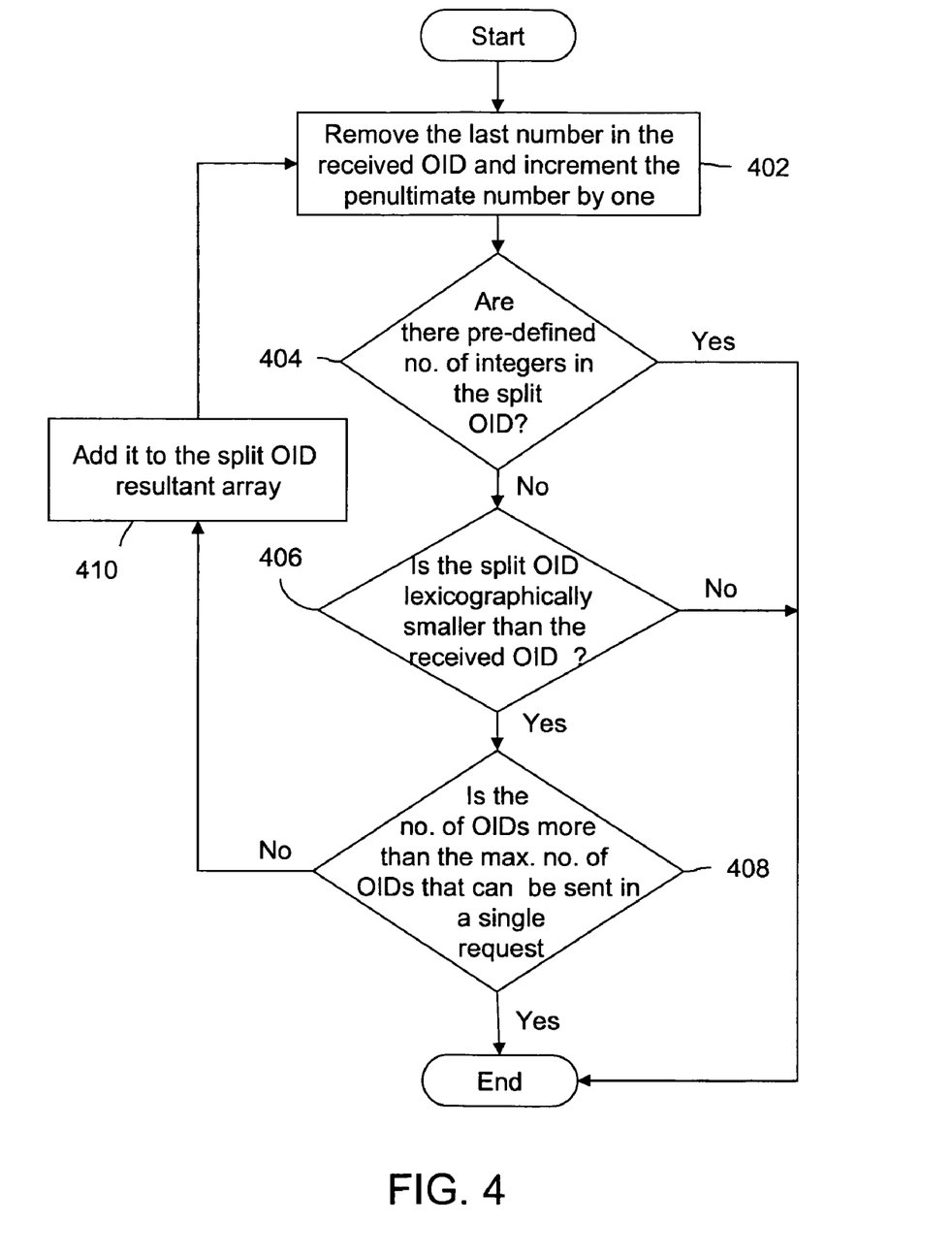
FIG. 4 is a flowchart depicting the process of splitting an OID to generate a set of OIDs.

FIG. 4 is a flowchart depicting the process of splitting an OID, according to step 306, to generate a set of OIDs. The splitting is done in order to skip a considerable amount of OIDs (range), i.e., to spread across the OID tree and to move further down the tree. This is because OIDs are not indexed. Conventionally, there is no function available that can retrieve an OID, (say) 245th OID from the OID tree. Also at any point of time, it is not possible to find the index of an OID, by giving the OID. At step 402, the received OID is split using a split function to generate another OID. In an embodiment, the algorithm for the split function comprises removing the last number in the received OID and incrementing the penultimate number by one at step 402. Subsequently, a check is performed at step 404 to verify whether there are a pre-defined number of integers in the OID. At step 406, another check verifies if the resulting OID is lexicographically smaller than the End OID. Further, at step 408, another check is performed to verify whether the OIDs that have been generated is less than a pre-defined maximum number of OIDs that can be sent in a single request. The split OID is added to an array of split OIDs at step 410. Step 402 is then repeated to generate a new OID. In this way, the above steps generate a set of OIDs.

A generalized split function that is used in an embodiment is described below as follows:

Let $X_1, X_2, X_3, X_4$ be OIDs in the Response Packet, where $X_1 < X_2 < X_3 < X_4$ Splitting $(X_1)$ gives $x_{11}, x_{12}, x_{13}, \ldots x_{1o}$ Splitting $(X_1)$ gives $x_{11}, x_{22}, \ldots x_{2p}$ Splitting $(X_3)$ gives $x_{31}, x_{32}, x_{33}, x_{34}, \ldots, x_{3q}$ Splitting $(X_4)$ gives $x_{41}, x_{42}, x_{43}, \ldots, x_{4r}$ where $X_1 < x_{11} < x_{12} < \ldots < X_{1n} < X_2 < x_{21} < x_{22} < \ldots < x_{2o} < X_3 < x_{31} < x_{32} < x_{33} < x_{34} < \ldots < x_{3p} < X_4 < x_{41} < x_{42} < x_{43} < \ldots < x_{4q}$ Less than "<" means If x<y=true, then 'x' is by some definite means always smaller than 'y'.

It can either be smaller lexicographically, numerically, alphabetically, and the like.

The splitting of a range involves two functions, a split function and an intermediate Get Next function. The split function is used to skip a considerable amount of OIDs (to move further down the tree, i.e., to spread across the tree). The intermediate Get Next query is sent in order to find the minimum OID, RangeMin, and the maximum OID, RangeMax, of each range found using the split function. For example, if OIDs 3 to 15 fall in Range 2, then, RangeMin(2)=OID 3, RangeMax(2)=OID 15

In another embodiment of the invention, splitting is performed by removing the last number in the received OID and multiplying the penultimate number by a constant, e.g., 2. Multiplication by a constant results in moving down the OID tree of the device.

It should be noted that alternate methods of splitting the OIDs exist, and can be selected depending on the structure of the OID tree. The working of the present invention remains applicable with any method of splitting, without diverting from the scope of the present invention.

Figure 5:
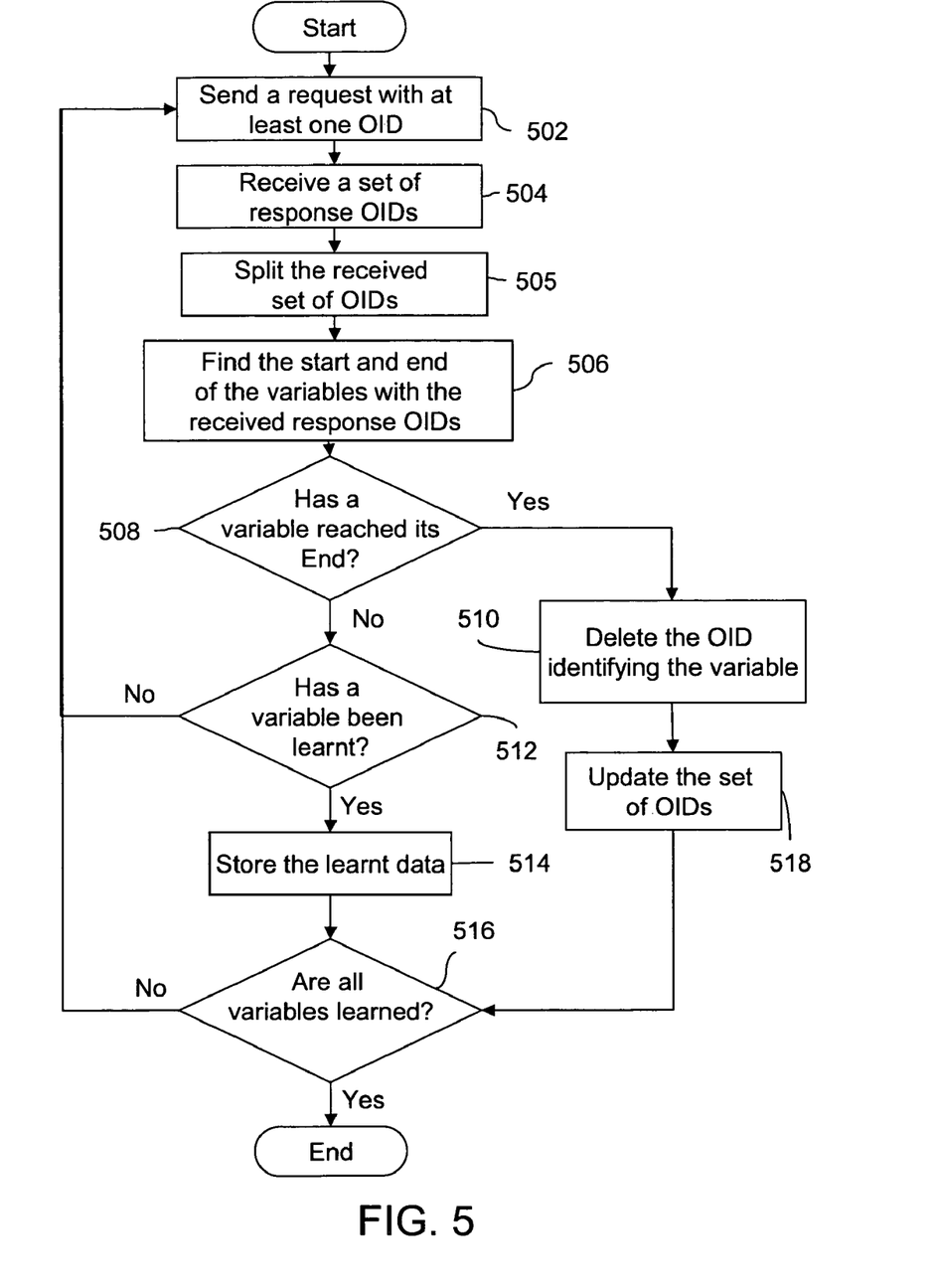
FIG. 5 is a flowchart depicting the process of learning the management information of the variables.

FIG. 5 is a flowchart depicting the steps involved in learning the management information of the variables. OIDs are sent to the device 104 in a single request at step 502. The Response OIDs received at step 504 are passed to the split function at step 505 and the result of the split function are passed to step 506 to find the start and end of each variable. Based on this identification, a check is made at step 508 on each variable, to determine whether each of these variables has reached their end, i.e., whether the start and end OIDs of each variable are the same. If there is any variable that has reached its end, then the OID identifying that variable is deleted from the set of generated OIDs at step 510. The set of OIDs is then updated at step 518. If the management information of any variable is learnt in the process at step 512, the management information corresponding to that variable is stored at step 514. This process is repeated until the management information of all the variables is learnt, which is checked at step 516. The OIDs identifying the variables and their corresponding management information are stored in a buffer until all the lexicographically smaller OIDs are written to a file first.

Figure 6:
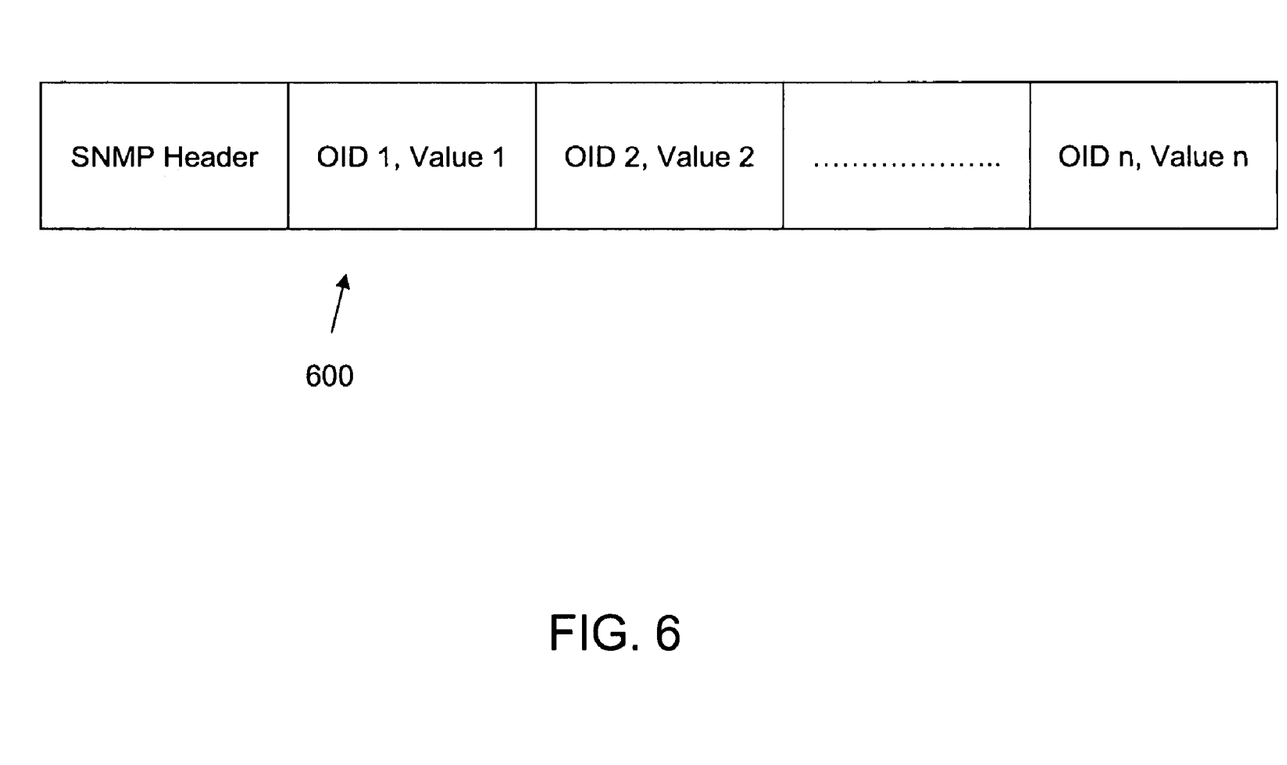
FIG. 6 is an exemplary Get Next Request, used in an exemplary embodiment of the present invention.

FIG. 6 illustrates an exemplary Get Next Request 600, sent from NMS 102 to device 104. Request 600 comprises an SNMP Header and the OIDs. It is to be noted that Get Next Request 600 is capable of sending more than one OID at a time. The maximum number of OIDs that can be sent in a single request is limited by a minimum of: maximum message size that the destination SNMP entity can accept, and the maximum message size that the source SNMP entity can generate.

The method described above is further explained in conjunction with the following example. FIG. 7 is an exemplary OID tree formed by the OIDs of a device in a network. Consider the Initial OID to be 1.3.6.1.2.1.2.2.1.2. An SNMP Get Next Request is sent with this initial OID, in accordance with step 302. The value of the OID sent in the request is Null. The value is Null since; NMS 102 does not know the value of the corresponding OID. In response to this request, device 104 sends the OID of a variable and its management information, in accordance with step 304. For example, as illustrated in FIG. 7, the variable identified by OID 1.3.6.1.2.1.2.2.1.2.1 is sent. The value ATM0 is the corresponding management information. The response OID, 1.3.6.1.2.1.2.2.1.2.1, is obtained, since this is the smallest OID that is lexicographically greater than 1.3.6.1.2.2.1.2 (OID sent in the request).

This OID received in the response, OID 5 in the OID tree of FIG. 7, is then split in accordance with step 306 to obtain a set of OIDs. A split function is applied to generate the set of OIDs. If the split function involves removing the last number, and adding one to the penultimate number, the set of OIDs that is generated comprises the following:

1.3.6.1.2.1.2.2.1.3
1.3.6.1.2.1.2.2.2
1.3.6.1.2.1.2.3
1.3.6.1.2.1.3
1.3.6.1.2.2
1.3.6.1.3
1.3.6.2

The splitting process is stopped when there are four integers left in the OID, or if the resulting OID is greater than the End OID, or if the total number of OIDs is more than the device capability. These conditions are mentioned in steps 404, 406, and 408 of FIG. 4. The splitting is stopped when there are four integers left in the OID because on further splitting, the resultant OIDs 1.3.7, 1.4, and 2 would always result in an 'End of MIB' error. Therefore, OIDs 1.3.7, 1.4 and 2 are not sent. The set of OIDs obtained by splitting is then sent in a single Get Next Request, to determine the start and end of the variables corresponding to each OID in this set. The SNMP Get Next Request is as follows:

| | |
|---|---|
| OID 1 = 1.3.6.1.2.1.2.2.1.3, | Value = Null |
| OID 2 = 1.3.6.1.2.1.2.2.2, | Value = Null |
| OID 3 = 1.3.6.1.2.1.2.3, | Value = Null |
| OID 4 = 1.3.6.1.2.1.3, | Value = Null |
| OID 5 = 1.3.6.1.2.2, | Value = Null |
| OID 6 = 1.3.6.1.3, | Value = Null |
| OID 7 = 1.3.6.2, | Value = Null |

The OIDs that are sent in the request packet need not be available in the agent, i.e., there may not be any OIDs such as 1.3.6.1.2.1.3, 1.3.6.1.2.2, since such a variable is not present in device 104. In such cases, the response from agent 204 contains OIDs that are greater (lexicographically greater) than the corresponding OID in the request. For example, for OID 4=1.3.6.1.2.1.3, the response comprises the OID 1.3.6.1.2.1.3.1.1.1.2.1.10.77.241.1, i.e., OID 37 from the OID Tree in FIG. 6 (This being the smallest OID that is lexicographically greater than 1.3.6.1.2.1.3). Similarly, for OID 5=1.3.6.1.2.2, the response is 1.3.6.1.4.1.9.2.1.1.0, i.e., OID 56 from the OID Tree (This being the smallest OID that is lexicographically greater than 1.3.6.1.2.2). In this way, the SNMP response comprises the following:

| | |
|---|---|
| OID 1 = 1.3.6.1.2.1.2.2.1.3.1, | Value = 53 |
| OID 2 = 1.3.6.1.2.1.2.2.2.5.2, | Value = 10000000 |
| OID 3 = 1.3.6.1.2.1.2.3.1.1.1, | Value = 1 |
| OID 4 = 1.3.6.1.2.1.3.1.1.1.2.1.10.77.241.1, | Value = 2 |
| OID 5 = 1.3.6.1.4.1.9.2.1.1.0, | Value = SNMP |
| OID 6 = 1.3.6.1.4.1.9.2.1.1.0, | Value = SNMP |
| OID 7 = 1.3.6.2.1.3.1.1.0, | Value = 852 |

For the example stated above, the result is as follows:

| | |
|---|---|
| OID 1 = 1.3.6.1.2.1.2.2.1.3.1 | => OID 7 |
| OID 2 = 1.3.6.1.2.1.2.2.2.5.2 | => OID 18 |
| OID 3 = 1.3.6.1.2.1.2.3.1.1.1 | => OID 25 |
| OID 4 = 1.3.6.1.2.1.3.1.1.1.2.1.10.77.241.1 | => OID 37 |
| OID 5 = 1.3.6.1.4.1.9.2.1.1.0 | => OID 56 |
| OID 6 = 1.3.6.1.4.1.9.2.1.1.0 | => OID 56 |
| OID 7 = 1.3.6.2.1.3.1.1.0 | => OID 100 |

The start and end of each OID is then inferred based on these responses, by assigning the subsequent (i.e. n+1th) OID as the end OID for current (i.e. nth) OID.

For example, the start OID of variable 2 is OID 7 and it can be iterated until OID 18 is reached, which is its end OID. Similarly, the start OID of variable 3 is OID 18 and it is iterated until it reaches OID 25, which is its end OID. The iteration of OID 7 is stopped at OID 18 since the range from OID 18 to OID 25 is being simultaneously learnt.

Once the start and end of each variable is identified, a data structure comprising the start and end of each variable is built as follows:

| Variable | Start OID | End OID | Range |
|---|---|---|---|
| 1 | 1.3.6.1.2.1.2.2.1.2.1 (OID 5) | 1.3.6.1.2.1.2.2.1.3.1 (OID 7) | 1 |
| 2 | 1.3.6.1.2.1.2.2.1.3.1 (OID 7) | 1.3.6.1.2.1.2.2.2.5.2 (OID 18) | 2 |
| 3 | 1.3.6.1.2.1.2.2.2.5.2 (OID 18) | 1.3.6.1.2.1.2.3.1.1.1 (OID 25) | 3 |
| 4 | 1.3.6.1.2.1.2.3.1.1.1 (OID 25) | 1.3.6.1.2.1.3.1.1.1.2.1.10.77.241.1 (OID 37) | 4 |
| 5 | 1.3.6.1.2.1.3.1.1.1.2.1.10.77.241.1 (OID 37) | 1.3.6.1.4.1.9.2.1.1.0 (OID 56) | 5 |
| 6 | 1.3.6.1.4.1.9.2.1.1.0 (OID 56) | 1.3.6.1.4.1.9.2.1.1.0 (OID 56) | 6 |
| 7 | 1.3.6.1.4.1.9.2.1.1.0 (OID 56) | 1.3.6.2.1.3.1.1.0 (OID 100) | 7 |
| 8 | 1.3.6.2.1.3.1.1.0 (OID 100) | End OF MIB TREE | 8 |

In the table above, for variable 2, the start OID is OID 7, and the iteration is performed until OID 18 is reached, which is its end OID. Similarly, the start OID of variable 3 is OID 18, and the iteration is performed until it reaches OID 25, which is the end OID.

In the above table, OIDs that fall between the start and the end OID, define a Range. For example, Range 1 consists of the OIDs that fall between OID 5 and OID 7 and Range 2 consist of those OIDs that fall between OID 7 and OID 18 and so on till Range 8 that consists of those OIDs that fall between OID 100 and the end of MIB tree. From the above table, it is evident that the ranges are not evenly distributed and they are not pre-known. As is also evident, in Range 6, the start and end OID are the same. Therefore, we delete the OID identifying that variable from the set of OIDs that is generated by splitting.

The updated set of OIDs, i.e., the set of OIDs left after the purging of the OIDs, is then sent in a single Get Next Request. Based on the response, if a variable has reached its end, the OID identifying that variable is purged, and if the management information of a variable has been learnt in the process, it is stored. An exemplary Get Next Request, and the subsequent response using the updated set of OIDs, is as follows:

The exemplary SNMP Get Next Request (To SNMP Agent in the device) are:

| | |
|---|---|
| OID 1 = 1.3.6.1.2.1.2.2.1.2.1 | Value = Null (OID 5), Range1 |
| OID 2 = 1.3.6.1.2.1.2.2.1.3.1 | Value = Null (OID 7), Range 2 |
| OID 3 = 1.3.6.1.2.1.2.2.2.5.2 | Value = Null (OID 18), Range 3 |
| OID 4 = 1.3.6.1.2.1.2.3.1.1.1 | Value = Null (OID 25), Range 4 |
| OID 5 = 1.3.6.1.2.1.3.1.1.1.2.1.10.77.241.1 | Value = Null (OID 37), Range 5 |
| OID 6 = 1.3.6.1.4.1.9.2.1.1.0 | Value = Null (OID 56), Range 7 |
| OID 7 = 1.3.6.2.1.3.1.1.0 | Value = Null (OID I00), Range 8 |

The exemplary SNMP Responses (From SNMP Agent in the device) are:

| | | |
|---|---|---|
| OID 1 = 1.3.6.1.2.1.2.2.1.2.2, | Value = Ethernet0 | (OID 6), Range1 |
| OID 2 = 1.3.6.1.2.1.2.2.1.3.2, | Value = 6 | (OID 8), Range 2 |
| OID 3 = 1.3.6.1.2.1.2.2.2.6.1, | Value = 234 | (OID 19), Range 3 |
| OID 4 = 1.3.6.1.2.1.2.3.1.1.2, | Value = 2 | (OID 26), Range 4 |
| OID 5 = 1.3.6.1.2.1.3.1.1.2.2.1.10.77.241.1, | Value = 0x00044 | (OID 38), Range 5 |
| OID 6 = 1.3.6.1.4.1.9.2.1.2.0, | Value = bus error at | (OID 57), Range 7 |
| OID 7 = 1.3.6.2.2.3.2.0, | Value = 100 | (OID 101), Range 8 |

The OIDs from the response in the previous step are used to construct the next Get Next Request. This involves a repetition of the process of splitting. The following is an illustration of the SNMP Get Next Request for the same:

| | | |
|---|---|---|
| OID 1 = 1.3.6.1.2.1.2.2.1.2.2 | Value = Null | (OID 6), Range1 |
| OID 2 = 1.3.6.1.2.1.2.2.1.3.2 | Value = Null | (OID 8), Range 2 |
| OID 3 = 1.3.6.1.2.1.2.2.2.6.1 | Value = Null | (OID 19), Range 3 |
| OID 4 = 1.3.6.1.2.1.2.3.1.1.2 | Value = Null | (OID 26), Range 4 |
| OID 5 = 1.3.6.1.2.1.3.1.1.2.2.1.10.77.241.1 | Value = Null | (OID 38), Range 5 |
| OID 6 = 1.3.6.1.4.1.9.2.1.2.0 | Value = Null | (OID 57), Range 7 |
| OID 7 = 1.3.6.2.2.3.2.0 | Value = Null | (OID 101), Range 8 |

In this way, SNMP Get Next Requests [OID 7, OID 18, OID 25] leads to the generation of a new set of OIDs, i.e., [OID 8, OID 19, OID 26 . . . ]. The OIDs from this response are stuffed in the next SNMP Get Next Request. Therefore, SNMP Get Next Request [OID 8, OID 19, OID 26 . . . ] give responses [OID 9, OID 20, OID 27 . . . ]. In this manner, the management information for the remaining variables is learnt.

For example, with the help of the second OID (OID 18 in the above request) in the "SNMP Get Next Request", the management information for the OIDs from 18 to 25 is learnt. Similarly, the range of OIDs from 25 to 37 is learnt by the third OID (OID 25 in the above request), and learning the range of OIDs from OID 7 to OID 18 is in progress at the same time.

SNMP Get Next Request [OID 14, OID 32 . . . ] give responses [OID 15, OID] Subsequently, OIDs 14 and 32 are further split and all the split OIDs are stuffed in the same SNMP Get next Request and sent to the device.

The process is repeated until there are no variables for which management information has not been learnt. Therefore, variables in the different ranges are learnt simultaneously, thereby reducing the number of Get Next Requests sent to learn the variables.

The learnt variables are then stored in a file in a lexicographical manner. For example, assume that OIDs 3 to 15 (Range 2) and OIDs 34 to 39 (Range 7) are being learnt simultaneously. Though Range 7 is learnt fully before Range 2, it cannot be written to the file before writing ranges 2, 3, 4, 5 & 6. In short, the OID-value pairs in a range can be written to a file only after all the OID-value pairs of the lesser ranges are written to the file. A purge-value function and write-to-file function are used to enable this lexicographical storing of the information.

The "Purge Values" function temporarily stores the OID-value pairs in memory & removes the OIDs of the ranges, which has reached its end from the "Get Next" query. The "Write to File" function writes them to file once all the ranges lesser than the current range is written to file.

Although the invention is discussed primarily with respect to SNMP, NMS and discovery of OIDs, it will be apparent that other applications are possible. In general, features of the invention may be applicable whenever it is desired to obtain identifiers or other values from a set of possible values by querying a device or process. Such querying can be by the use of a communications protocol or other exchange of information. For example, free sectors or other allocable storage units in a cache, hard disc, RAID, etc., can be discovered by using a range splitting and querying approach. Database accesses can use the invention's range-query approach to find empty seats in a theater, free records, assigned or unassigned resources (e.g., personal identification (PID) numbers, passwords, and usernames), etc.

Figure 8:
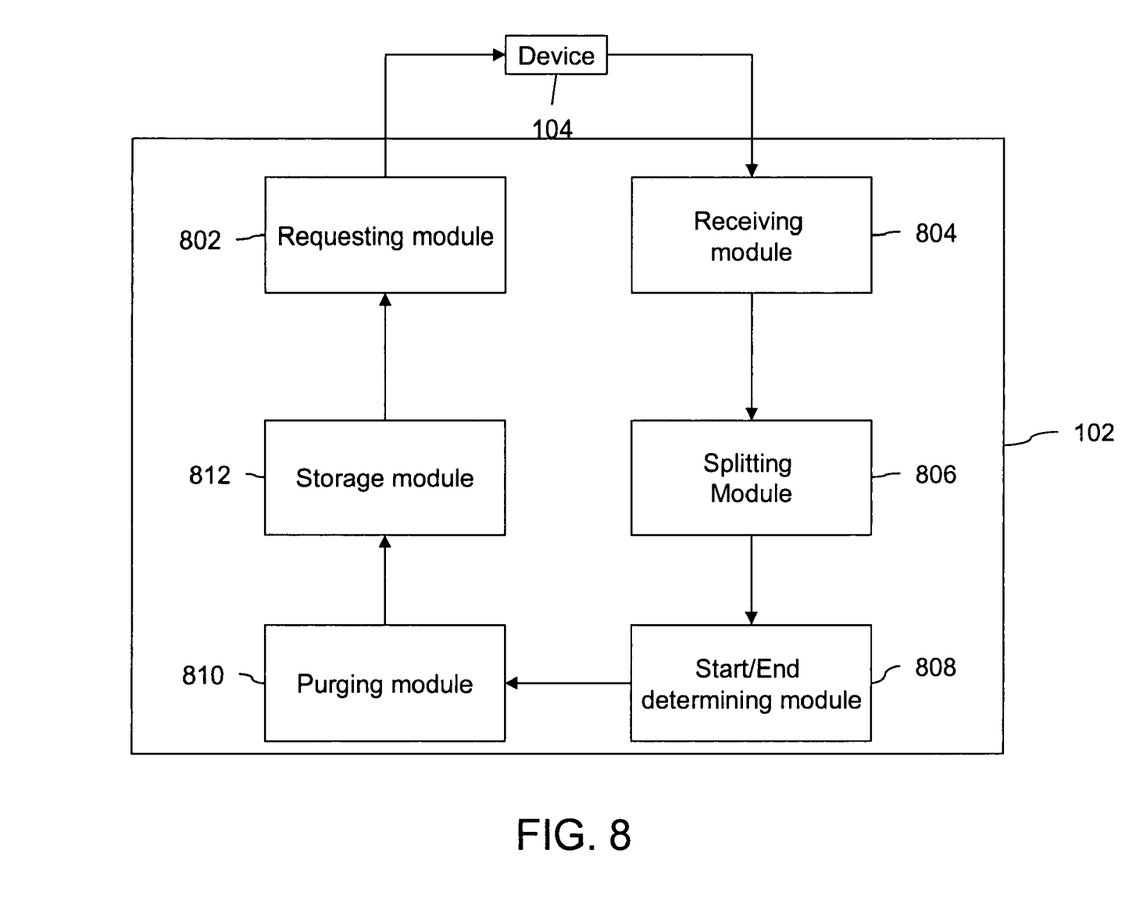
FIG. 8 is a block diagram of an exemplary Network Management System.

FIG. 8 is a block diagram of exemplary NMS 102. NMS 102 comprises a module for sending a request or a requesting module 802. Requesting module 802 sends Get Next Request 600 to device 104 for the management information of the variables in device 104. The response to the request is received by a receiving module 804. The received OID, in response, is split by a splitting module 806. The split OIDs are sent in a single Get Next Request packet. Based on the response, a module for determining the start and end of the variable, i.e., a start/end determining module 808, determines the variables that have reached their end. A module for deleting or purging module 810 purges the OID identifying the variable that has reached is end. The variables, whose management information has been learnt, are stored by a module for storing or storage module 812.

Each of the above-mentioned modules of NMS 102 can be a firmware chip with a processor attached to a flash memory, containing program instructions to implement the said functions. Alternatively, each of the modules can be a software program that performs the functions described above and resides in a processor.

Although the invention has been discussed with respect to the specific embodiments thereof, these embodiments are merely illustrative, and not restrictive, of the invention. For example, "management information" can include any type of information that is necessary to anticipate the needs of a network at a time of network operation. A network management system can be any type of management system used at a time of operation to reconfigure or modify a network or to otherwise allocate network resources. A management information can include any type of network performance characteristic such as bandwidth (e.g., physical or virtual links or channels; time division, code division, frequency division or other multiplexing or sharing of lines, etc.), signal conversion and/or interfacing, processing resources (e.g., CPU cycles, memory capacity, storage, input/output ports or other resources, etc.), network storage, buffering or other information.

Although specific protocols have been used to describe embodiments, other embodiments can use other transmission protocols or standards. Use of the terms "device" and "variable" can include any type of device, operation or other process. The present invention can operate between any two processes or entities including users, devices, functional systems or combinations of hardware and software. Networks such as peer-to-peer, client-server, and any other networks or systems where the roles of client and server are switched, change dynamically, or that are not even present are within the scope of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   requesting a management information variable from a device on a network, the management information variable includes management information associated with the device, the management information variable comprising at least one object identifier (OID);
   receiving a response from the device, the response comprising the requested management information variable including a single OID, the single OID comprising a sequence of numbers;
   using the received single OID to generate a set of OIDs, the set of OIDs generated by:
      assigning the single OID as a seed OID;
      adding the seed OID as part of the set of OIDs;
      splitting the seed OID, the splitting of the seed OID comprising:
         removing a last number in the sequence of numbers of the seed OID, the removal of the last number the sequence of numbers creating a new last number in the sequence of numbers of the seed OID,
         incrementing the new last number in the sequence of numbers by one,
         generating a new OID as a result of incrementing the last number in the sequence of numbers of the a new OID, and
         assigning the new OID as the seed OID, and
      repeating the splitting of the seed OID until a threshold is achieved, wherein the set of OIDs is generated at least upon achieving the threshold; and sending the generated set of OIDs in a single request to the device.

2. The method of claim 1, wherein the threshold comprises at least one of:
a pre-defined maximum number of OIDs that can be sent in a single request to the device,
a pre-defined number of integers in the new OID,
a pre-defined number of integers in the seed OID, and
an OID value that is a lexicographically greater value than a value of a corresponding End OID, the End OID being a last OID in the set of OIDs.

3. The method of claim 1, wherein the received OID comprises at least two numbers in the sequence of numbers.

4. The method of claim 1, further comprising:
sending a request to the device for identifying a start and an end of the management information variable;
purging an OID identifying the management information variable from the generated set of OIDs that is found at the start and the end of the variable; and
querying all the OIDs left after purging, in a subsequent request to the device to identify management information variables of the queried OIDs.

5. A non-transitory computer readable medium including instructions executable by one or more processors for:
requesting a management information variable from a device on a network, the management information variable includes management information associated with the device, the management information variable comprising at least one object identifier (OID);
receiving a response from the device, the response comprising the requested management information variable including a single OID, the single OID comprising a sequence of numbers;
using the received single OID to generate a set of OIDs, the set of OIDs generated by:
assigning the single OID as a seed OID;
adding the seed OID as part of the set of OIDs;
splitting the seed OID, the splitting of the seed OID comprising:
removing a last number in the sequence of numbers of the seed OID, the removal of the last number the sequence of numbers creating a new last number in the sequence of numbers of the seed OID,
incrementing the new last number in the sequence of numbers by one,
generating a new OID as a result of incrementing the last number in the sequence of numbers of the a new OID, and
assigning the new OID as the seed OID, and
repeating the splitting of the seed OID until a threshold is achieved, wherein the set of OIDs is generated at least upon achieving the threshold; and
sending the generated set of OIDs in a single request to the device.

6. The non-transitory computer readable medium of claim 5, wherein the received OID comprises at least two numbers in the sequence of numbers.

7. The non-transitory computer readable medium of claim 5, wherein the threshold comprises at least one of:
a pre-defined maximum number of OIDs that can be sent in a single request to the device,
a pre-defined number of integers in the new OID.

8. The non-transitory computer readable medium of claim 5, wherein the threshold comprises at least one of:
a pre-defined number of integers in the seed OID, and
an OID value that is a lexicographically greater value than a value of a corresponding End OID, the End OID being a defined last OID in the set of OIDs.

9. A system for rapid learning of device parameters, the system comprising:
a requesting module, connected to a network, that is configured to request a management information variable from a device on the network, the management information variable includes management information associated with the device, the management information variable comprising at least one object identifier (OID);
a receiving module, connected to the network, that is configured to receive a response from the device, the response comprising the requested management information variable including an OID, the OID comprising a sequence of numbers;
a splitting module, connected to the receiving module, that is configured to generate a set of OIDs from a single OID, the set of OIDs generated by:
assigning the single OID as a seed OID;
adding the seed OID as part of the set of OIDs;
splitting the seed OID, the splitting of the seed OID comprising:
removing a last number in the sequence of numbers of the seed OID, the removal of the last number the sequence of numbers creating a new last number in the sequence of numbers of the seed OID;
incrementing the new last number in the sequence of numbers by one,
generating a new OID as a result of incrementing the last number in the sequence of numbers of the a new OID, and
assigning the new OID as the seed OID, and
repeating the splitting of the seed OID until a threshold is achieved, wherein the set of OIDs is generated at least upon achieving the threshold; and
a storage module, connected to the requesting module, that is configured to:
receive the set of generated OIDs;
store the set of generated OIDs; and
send the set of OIDs to the requesting module.

10. The system of claim 9, wherein the received OID comprises at least two numbers in the sequence of numbers.

11. The system of claim 9, further comprising:
the requesting module configured to send a request to the device for identifying a start and an end of the management information variable;
a determining module for the management information variable, connected to the splitting module, configured to determine whether an OID identifying the management information variable from the generated set of OIDs is located at the start or end of the management information variable; and
a purging module, connected to the determining module and the storage module, configured to purge an OID identifying the management information variable from the generated set of OIDs that is determined to be located at the start and the end of the management information variable.

12. The system of claim 11, wherein the threshold comprises at least one of:
a pre-defined maximum number of OIDs that can be sent in a single request to the device,
a pre-defined number of integers in the seed OID.

13. The system of claim 9, wherein the threshold comprises at least one of:
a pre-defined number of integers in the new OID, and
an OID value that is a lexicographically greater value than a value of a corresponding End OID, the End OID being a defined last OID in the set of OIDs.

* * * * *